Nov. 7, 1939.    G. H. EARP-THOMAS    2,178,818
BACTERIOLOGICAL DIGESTER FOR CONVERSION OF ORGANIC WASTE
Filed March 23, 1937    2 Sheets-Sheet 1
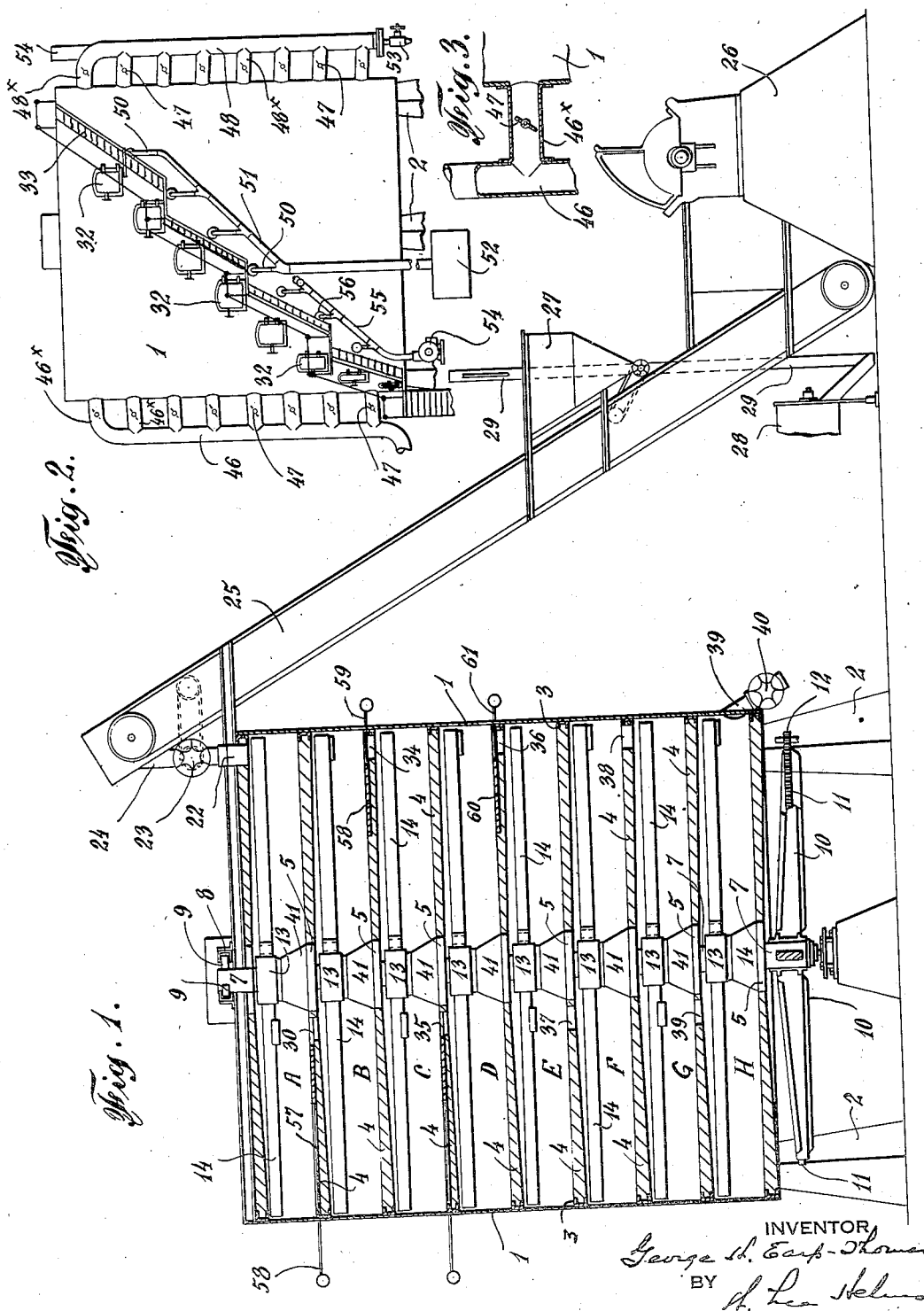
INVENTOR
George H. Earp-Thomas
BY
H. Leo Helm
ATTORNEY Nov. 7, 1939.  G. H. EARP-THOMAS  2,178,818
BACTERIOLOGICAL DIGESTER FOR CONVERSION OF ORGANIC WASTE
Filed March 23, 1937  2 Sheets-Sheet 2
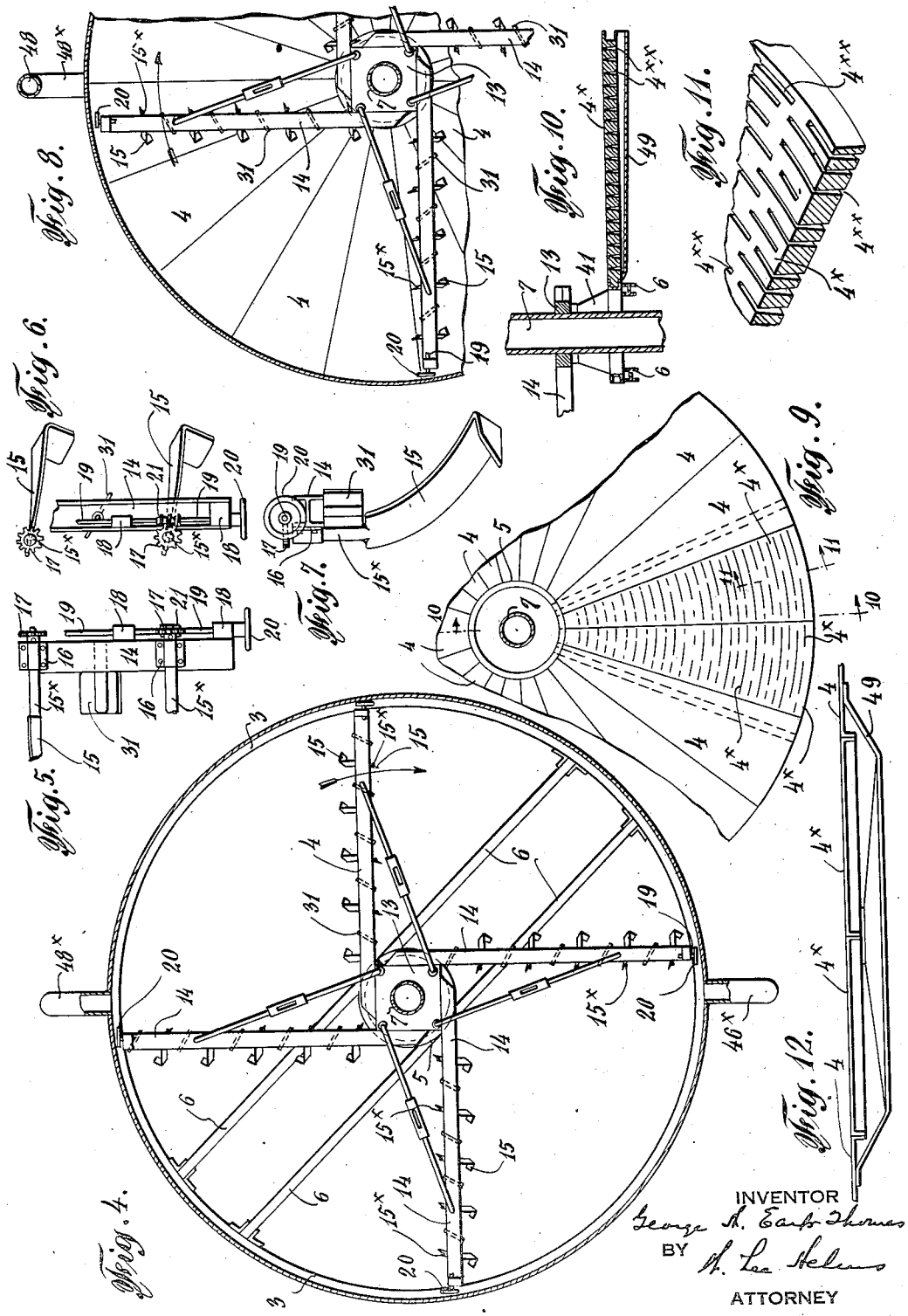

Patented Nov. 7, 1939

2,178,818

UNITED STATES PATENT OFFICE 2,178,818

BACTERIOLOGICAL DIGESTER FOR CONVERSION OF ORGANIC WASTE

George Herbert Earp-Thomas, Glen Ridge, N. J.

Application March 23, 1937, Serial No. 132,507

2 Claims. (Cl. 34—23)

The object of this invention is to provide an apparatus for the conversion of organic waste by bacterial action, characterized by means for simultaneously moving a plurality of superposed separate layers of organic material in alternately different directions within a tank divided by horizontal decks into a plurality of communicating horizontal chambers, the material being thus moved laterally having applied to it movements for aeration. Means are also provided for controlling the speed of lateral movement of the organic material.

A further characteristic of the invention is the provision of means, controlled as to degree of its action, causing the passage of air across the moving body of organic material within each chamber of the tank chamber, together with means for exhausting vapor and gases in like controlled manner.

A further characteristic of the invention is the provision of means for maintaining constant level of the organic material within each chamber for insuring proper discharge of material from one chamber to a lower succeeding chamber.

A further characteristic of the invention is the provision of specially designed means for the separation and discharge of liquids freed from the organic matter in the bacteriologic process.

The invention will be described with reference to the accompanying drawings, in which:

Figure 1 is a view in sectional elevation of an apparatus constructed in accordance with the invention.

Figure 2 is a schematic view in elevation of the same, omitting conveyor elements and other incidental members.

Figure 3 is a view in sectional elevation, enlarged, of the inlet air manifold and a branch pipe leading to a division of the feeding chamber.

Figure 4 is a horizontal section taken immediately above the element lettered 14, Figure 1.

Figure 5 is a fragmentary view in side elevation of one of the rotor arms illustrating means for simultaneously adjusting a plurality of feeding ploughs.

Figure 6 is a plan view of the elements shown in Figure 5.

Figure 7 is a view in end elevation of the structure shown in Figures 5 and 6.

Figure 8 is a fragmentary horizontal section similar to Figure 4, but showing the rotor arms with the feeding ploughs and levelling plates of a division or "deck" either below or above that of Figure 4.

Figure 9 is a fragmentary plan view of one of the decks with the provision therein of drain plates for the discharge of liquid from the tank.

Figure 10 is a vertical section on the line 10—10, Figure 9.

Figure 11 is a fragmentary perspective view, partly in vertical section, and enlarged, showing the formation of a drain plate.

Figure 12 is an enlarged outer end elevation of two drain plates, the adjacent deck structure and a collection sump underlying the plates.

Referring to the drawings, it will be seen that the embodiment of the invention therein illustrated, comprises a cylindrical tank-like member 1 which may, as an example of one commercial structure, be approximately 24' in height and 19' in width. The tank may be supported by the pillars 2 of any suitable number and of concrete or the like.

The tank is interiorly divided into eight horizontal division sections or chambers. To this end, the inner wall has welded or riveted thereto a plurality of supporting channeled rings 3 spaced, in the present embodiment, approximately 30". These rings form the outer supporting means for deck plates 4, the inner supporting means for the plates of each deck being the appropriate ring of a series of rings 5 held axially of tank 3 by transversely extending frame beams 6, as indicated in Figure 4, wherein the plates of a deck have been removed to expose a set of beams 6.

Extending vertically through the center of the tank and hence through the rings 5 is a tubular shaft 7. At the top of the tank is a bearing housing 8 supporting a plurality of bearing rollers 9 which contact with the shaft for maintaining it in alignment. The lower end of the shaft projects below tank 1 and carries a rack wheel at the periphery of which is an annular rack 11 engaged by a driven pinion 12 connected to a motor (not shown). By such means the shaft 7 is given a rotational movement.

Within each deck chamber and near the top thereof, clamped to shaft 7, is a carrying block 13, and secured to each block are four arms 14 which may be of channel-iron construction.

Each arm carries a plurality of feeding ploughs 15, and the method of securing the ploughs to arm 14 is shown more particularly in Figures 5 to 7 inclusive.

Each plough has an upper shaft-like end 15x received within a strap 16 bolted or otherwise secured to the appropriate arm 15. In some cases it may be desirable to simultaneously adjust the position of all the ploughs of an arm 14. To this end, each of the ends 15x of the ploughs may project above the arm 14 and carry a pinion 17.

Held on the arm by apertured bearing blocks 18 may be disposed a shaft 19 having at the end of the arm a hand-wheel 20. Shaft 19 carries a plurality of worms 21, each in mesh with one of the pinions 17 so that by rotating the hand wheel 20 each plough may be given an adjustment as desired.

As shown in Figure 7, the feeding ploughs are formed at their lower ends with lifting plates upwardly inclined from their front or deck-engaging edges, so that as the rotor arms move the ploughs, as in the direction of the arrow, Figure 4, the organic material within each of the chambers is alternately raised from the bottom deck of the chamber and lowered to the deck for the purpose of aeration, and discharge of vapor trapped at the lower surface of the mass of organic material, all in addition to the feeding and mixing effect of the ploughs.

As shown in Figure 4, I prefer that the ploughs carried by one arm be placed each at a different radial position than that of any other plough carried by the four rotor arms. Thus, in a chamber of the dimensions stated, the ploughs carried by the four rotor arms will contact in their movement with the entire surface of the underlying deck and hence each portion of the organic material supported by the deck will be raised and gradually moved toward the surface a series of undulating wave-like formations for the purposes stated.

Referring to Figure 1, it will be seen that chamber A will receive organic material from an inlet pipe 22 at the top of which is a rotary pocket member 23, the pockets of which receive comminuted material from a chute 24, the material being carried upward from a lower point by means of any suitable conveyor diagrammatically illustrated at 25.

At the bottom of the conveyor may be placed a device for comminuting the organic stocks, such a device being indicated at 26, and at 27 I have diagrammatically shown an inoculating hopper which is adapted to discharge the inoculant material onto the organic material being caried upward by conveyor 25. A mixer 28 for the inoculant may deliver the latter to hopper 27 by means of a feeding conduit 29.

As the material is fed into the topmost chamber A at the outer margin thereof, the feeding ploughs will gradually move the organic material to a discharge opening at 30 in the deck structure, and levelling plates 31, as shown in full lines in Figure 5 and dotted lines in Figures 4 and 8, will maintain the proper level of the organic material within the chamber and will co-act with the ploughs in the axial gradual movement of the material toward opening 30. The speed of movement will be determined by the angle of adjustment of the feeding ploughs, which adjustment can be effected as to all of the ploughs of a rotor arm by means of a hand wheel 20. The wall of the tank will be provided with a series of doors such as 32, Figure 2, for access to the interior of each chamber and these doors may be reached by a stairway 33.

The material discharging through opening 30 from chamber A to chamber B will be carried from the center area of the tank to its outer wall by ploughs on the rotor arms of same chamber B, which ploughs will be reversed in position relatively to the ploughs of chamber A, as shown in Figure 8. From chamber B the material will be discharged to chamber C through an opening at 34, and the ploughs in chamber C will be positioned like those in chamber A so that the material will be discharged from chamber C through a centrally disposed opening at 35. The ploughs in chamber D will be positioned like those of chamber A and the material will be discharged through an opening 36 and carried by the ploughs in chamber E to a centrally disposed opening 37 and into chamber F. The ploughs in chamber F will move the material to discharge opening 38 and into chamber G where the ploughs reverse the direction of lateral movement of the material and cause it to be discharged through an opening 39 into chamber H. The ploughs of chamber H will convey the completed material to a discharge duct 39 and into the pockets of rotary pocket member 40 from which it will fall into suitable containers or onto a conveyor (not shown). The rotary shaft below blocks 13 may be protected by conical shields 41, each shield resting upon one of the ring supports 5 for the deck plates 4.

An air inlet manifold 46, Figure 2, may communicate with the interior of the tank by means of a series of branch ducts 46x, each duct leading to one of the chambers A to H inclusive near the top thereof, and each duct being controlled by a damper 47 (Figure 3) which damper may be manually or thermostatically operated.

At the opposite side of the tank there is a discharge manifold 48 connected to the interior of the tank by means of branch ducts 48x each duct communicating with one of the chambers A to H inclusive near the top for the outflow of vapor and gases.

Means are provided in a plurality of the decks for draining off liquid. To this end, in each of the said decks one or more of the deck plates is constructed, as shown in Figures 9, 10 and 11, with a series of draining slots of a peculiar formation, in that at the top of the plate each slot is less in width than at the bottom of the plate, the slots thus being inverted wedges.

In the drawings, the draining deck plates are shown at 4x, the slots being indicated at 4xx. It will be noted that the slots run in the direction of the movement of the ploughs, and that by reason of the shape of the slots the drain plates are self cleaning.

Below each drain plate or set of drain plates, may be disposed a sump 49 having a bottom wall inclined toward the wall of the tank so that the liquid will be led toward said tank wall and carried off by the appropriate branch pipe 50 connected to manifold 51 which discharges into a collection tank 52, Figure 2.

In the operation of the apparatus, organic waste of any kind, whether of animal or vegetable origin, is preferably passed through a comminutor 26 to break the waste into particles to make the mass more available to rapid bacterial action. The hopper 27 will carry a mixed culture suitable for the aerobic decomposition of the mass of organic matter and buffers for the control of the bacteriological growth of the mass, and which may consist of humus, marl, gypsum, and the like.

I prefer that each chamber of the tank be supplied with a thermometer to register temperatures indicating at all times the activity of the bacteria in the respective chambers and the state of decomposition therein. The temperature within each chamber is controlled by the dampers and the speed of movement of the material under decomposition. Thus, the top chamber may be maintained at a relatively low temperature of 80° F. to 100° F. under which temperature certain and enzymic bacteria thrive well. The succeeding chamber may have a temperature of 100–110° F.; the third chamber from the top 110–120° F.; the fourth chamber 120–130° F.; the fifth chamber 130–140° F.; the sixth chamber 140–150° F.; the seventh chamber 150–160° F.; and the lowermost chamber 160–180° F. With relatively slow decomposing material such as garbage and sewage screening, I so adjust the angle of the feeding ploughs that once a chamber is completely filled with a mass of organic material, that mass will be entirely discharged into a succeeding chamber in about three hours, whereas, in the case of fast decomposing materials such as fish, the angle of the ploughs may be adjusted to discharge the equivalent quantity in approximately two hours.

As the organic material moves laterally in each chamber and from one chamber to a succeeding chamber, it receives air from manifold 46 and branch ducts 46x which in a tank of the size given may be 6" in diameter, thus large enough to supply the necessary air for the rapid multiplication of the bacteria. The exhaust ducts 48x may be 12" in diameter with the size of tank specified, and thus sufficiently large to adequately remove the vapors to prevent putrefaction of the mass and to insure that the desirable bacteria will multiply and dominate the mass.

As stated above, the dampers 47 are adjusted to maintain ideal conditions by closely observing the rise and fall of temperatures indicated by the thermometers in each chamber, and by opening the dampers to cause greater flow of air into the chambers, if the temperature is too high, and by reversely adjusting the dampers if the temperature is too low. By this means, a perfect digestion, i. e., decomposition, of the organic material is accomplished without substantial odor and in a very rapid manner, superior to any process yet devised to my knowledge.

As the organic material moves from the top of the tank to the base thereof, and particularly through the first four chambers, the breaking down of the mass frees the water and other liquids contained therein, and these liquids are drained off by the means specified. When the organic material reaches the periphery of the lowermost chamber, it is fairly dry and of a granular dark nature comprising an ideal plant food, because of the fact that the organic matter, vegetable or animal, is broken down to simple organic compounds.

The decomposition action proceeds more rapidly at the top of the organic masses in the chambers and such area will have a lesser degree of moisture than the material immediately below it. By means of the levelling plates 31, the feeding of the top layer of organic material in each chamber is hastened, i. e., is at a relatively higher speed than the underlying organic material. Thus the angle of the levelling plates, as shown in Figures 4 and 8, will be greater than that of the feeding ploughs.

It will be understood that it is the vertically rising area of each feeding plough which providing the major feeding surface and that the degree of its action will be determined by the degree of its angle relatively to the rotor arm which carries it.

At 54 (Figure 2) I have shown a blower for hot air which will force hot air upwardly through a pipe 55 having branches 56 communicating with the interior of a desired number of chambers as, for example, the four lowermost chambers of the tank. The branch conduits 56 will discharge into a sump-like chamber 49 above which will be apertured portions of the overlying deck as, for example, one or a plurality of the plates 4x. By such means hot drying air may be passed into the moving masses of progressively drying material in said lower chambers to insure that the final treated product discharged from the tank will be adequately dry when it is advantageous that the final product reach a desired degree of dryness. The natural or forced passage of air from the intake manifold 46 to out-take manifold 48 will not be affected by the hot air blast passed through manifold 55 and branch manifolds 56 into the lower chambers. The hot air will take up moisture from the mass and will be carried by the draft of the normal drying currents through branches 48x to manifold 48.

When the material fed into the initial chamber of the tank is supersaturated with water as, for example, when sewage screenings and sludge or very wet fish constitutes the organic charge, it will generally be desirable to temporarily close opening 30 of deck A and perhaps opening 34 of deck B in order to give the material time to adequately drain and to prevent passage of moisture through opening 30 or opening 35 into the mass of material carried by lower decks. To this end, a slide cover plate 57 may be disposed in deck A and operated in any suitable manner to close opening 30, for the purposes of illustrating an operating rod being shown as projected through the tank and connected to cover plate 57. In like manner, a cover plate 58 may be disposed in deck B operated by rod 59 or in any other suitable manner so as to control opening 34. In deck D I have shown a third cover plate 60 which may be moved to control opening 36 by means of rod 61. Thus by closing chamber D from the underlying four chambers and by forcing hot air through the manifold 55 and branch pipes 56, the material within the four lower chambers may be completed as to the bacteriological action therein and thoroughly dried and ejected from the tank without admixture therewith of damper organic material from the preceding chambers.

Having described my invention, what I claim and desire to secure by Letters Patent, is as follows:

1. A bacteriological digester for conversion of organic material comprising a tank divided by horizontal floors into a plurality of superposed chambers and having an inlet at its top and a discharge port at its bottom, means for effecting passage of air into said chambers and for discharging vapor therefrom, passageways for the organic material being formed in the floors, a plurality of arms, each arm being supported for movement in a circular path in one of said chambers, means for moving the arms, and a plurality of feeding ploughs carried by each arm, each feeding plough comprising a flat-sided feeding plate depending from its supporting arm and terminating at its lower end with a lateral rearwardly inclined extension, bearing members carried by each arm and rotationally holding the plows, pinions carried by the plows of each arm, a shaft and bearing members therefor carried by each arm and worms carried by the shaft and engaging the plow pinions for holding the plows in position of adjustment thereof secured by rotation of the shaft and worms.

2. A bacteriological digester for conversion of organic material, comprising a tank divided by horizontal floors into a plurality of superposed chambers and having an inlet at its top and a discharge port at its bottom, means for effecting passage of air into said chambers and for discharging vapor therefrom, passageways for the organic material being formed in the floors, the passageway in one floor lying near the outer wall of the tank and the passageway in a succeeding floor lying near the center thereof, a plurality of arms, each arm being supported for movement in a circular path in one of said chambers, means for moving the arms, a plurality of feeding ploughs carried by each arm and held thereby adjacent the floors of the chambers and angularly of the arms to feed the organic material within said chambers axially thereof toward said passageways, and levelling feed plates carried by the arms near the top of each chamber and having their area of action substantially above the floor of the chamber, the plates being disposed angularly of said arms and the angular position of the plates being different from that of the feeding plows to axially feed the upper layer of organic material in each chamber at a greater speed than the lower layer therein.

GEORGE H. EARP-THOMAS.